US012662126B2

(12) United States Patent
Kato

(10) Patent No.: US 12,662,126 B2
(45) Date of Patent: Jun. 23, 2026

(54) VEHICLE CONTROL DEVICE, VEHICLE CONTROL METHOD, AND STORAGE MEDIUM FOR LANE CHANGE OF HOST VEHICLE

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 18/178,564

(22) Filed: Mar. 6, 2023

(65) Prior Publication Data

US 2023/0311892 A1 Oct. 5, 2023

(30) Foreign Application Priority Data

Mar. 30, 2022 (JP) ................................. 2022-056583

(51) Int. Cl.
B60W 30/18 (2012.01)
(52) U.S. Cl.
CPC ... B60W 30/18163 (2013.01); B60W 2520/10 (2013.01); B60W 2552/10 (2020.02); B60W 2554/4041 (2020.02); B60W 2554/4042 (2020.02); B60W 2554/4045 (2020.02); B60W 2710/20 (2013.01); B60W 2720/10 (2013.01)
(58) Field of Classification Search
CPC ......... B60W 30/1813; B60W 30/0956; B60W 10/20; B60W 60/001; B60W 2710/20; B60W 2552/10; B60W 2554/4041; B60W 2554/4042
See application file for complete search history.

(56) References Cited

U.S. PATENT DOCUMENTS

| | | | |
|---|---|---|---|
| 11,807,235 B1* | 11/2023 | Ferguson | B60T 7/22 |
| 2015/0360721 A1* | 12/2015 | Matsuno | B60W 30/18163 701/1 |
| 2016/0325750 A1* | 11/2016 | Kanda | B60W 30/18163 |

FOREIGN PATENT DOCUMENTS

| | | |
|---|---|---|
| JP | 2009-248892 | 10/2009 |
| JP | 2016-004445 | 1/2016 |
| JP | 2016004445 A * | 1/2016 |
| JP | 2020-166475 | 10/2020 |

(Continued)

OTHER PUBLICATIONS

Japanese Office Action for Japanese Patent Application No. 2022-056583 mailed Jan. 23, 2024.

*Primary Examiner* — Ramon A. Mercado
*Assistant Examiner* — Noah W Stiebritz
(74) *Attorney, Agent, or Firm* — Amin, Turocy & Watson, LLP

(57) ABSTRACT

A vehicle control device of an embodiment performs a lane change from a first lane in which the host vehicle travels to a second lane in a case where a first condition is satisfied, performs a lane change of returning from the second lane to the first lane in a case where a second condition is satisfied after the lane change to the second lane, determines, in a case where there are one or more preceding vehicles traveling in front of the host vehicle in the first lane, whether the set vehicle speed of the host vehicle is able to be maintained after the host vehicle performs the lane change from the second lane to the first lane, and determines whether a return lane change from the second lane to the first lane is performed.

6 Claims, 7 Drawing Sheets

(56)                       References Cited

FOREIGN PATENT DOCUMENTS

| JP | 2021-041828 | 3/2021 |
| JP | 2021-088281 | 6/2021 |

* cited by examiner

VEHICLE CONTROL DEVICE, VEHICLE CONTROL METHOD, AND STORAGE MEDIUM FOR LANE CHANGE OF HOST VEHICLE

CROSS-REFERENCE TO RELATED APPLICATION

Priority is claimed on Japanese Patent Application No. 2022-056583, filed Mar. 30, 2022, the content of which is incorporated herein by reference.

BACKGROUND

Field of the Invention

The present invention relates to a vehicle control device, a vehicle control method, and a storage medium.

Description of Related Art

In recent years, efforts have been made to provide access to sustainable transport systems that also consider the people in the most vulnerable positions among traffic participants. In order to realize this, efforts have been concentrated on research and development to further improve the safety and convenience of traffic through research and development related to automated driving technology. In this connection, a technique of determining whether a host vehicle can pass a preceding vehicle and the traveling conditions of the host vehicle and the preceding vehicle and executing passing control on the basis of the determination result is known (for example, Japanese Unexamined Patent Application, First Publication No. 2009-248892).

SUMMARY

Incidentally, in automated driving technology, depending on the speeds of vehicles in the vicinity of a host vehicle, there are cases in which appropriate passing control cannot be executed such when further passing control becomes necessary after passing control and after returning from a passing lane to an original lane.

The present invention was contrived in view of such circumstances, and one object thereof is to provide a vehicle control device, a vehicle control method, and a storage medium that make it possible to execute more appropriate passing control in consideration of the traveling condition after passing control. Further, this contributes to the development of a sustainable transport system.

The following configurations are adopted in a vehicle control device, a vehicle control method, and a storage medium according to this invention.

(1) According to an aspect of this invention, there is provided a vehicle control device including: a recognizer that recognizes a peripheral situation of a host vehicle; and a driving controller that controls one or both of steering and speed of the host vehicle on the basis of a result of recognition performed by the recognizer, wherein the driving controller performs a lane change from a first lane in which the host vehicle travels to a second lane in a case where a first condition is satisfied, and performs a lane change of returning from the second lane to the first lane in a case where a second condition is satisfied after the lane change to the second lane, the second condition including that a set vehicle speed of the host vehicle is able to be maintained after the host vehicle performs the lane change to the first lane, and in a case where there are one or more preceding vehicles traveling in front of the host vehicle in the first lane, the driving controller determines whether the set vehicle speed of the host vehicle is able to be maintained after the host vehicle performs the lane change from the second lane to the first lane on the basis of a speed of the slowest of the one or more preceding vehicles and a speed of the host vehicle, and determines whether a return lane change from the second lane to the first lane is performed on the basis of a determination result.

(2) In the aspect of the above (1), in a case where there are a first preceding vehicle traveling in front of the host vehicle in the first lane and a second preceding vehicle traveling in front of the host vehicle in the second lane and the second preceding vehicle is predicted to perform a lane change from the second lane to the first lane, the driving controller determines whether the set vehicle speed of the host vehicle is able to be maintained after the host vehicle performs the lane change from the second lane to the first lane on the basis of a speed of the first preceding vehicle, a speed of the second preceding vehicle, and the speed of the host vehicle.

(3) In the aspect of the above (2), the driving controller inhibits the host vehicle from performing the lane change from the second lane to the first lane in a case where the speed of the first preceding vehicle in the first lane is lower than the set speed of the host vehicle.

(4) In the aspect of the above (2), the driving controller inhibits the host vehicle from performing the lane change from the second lane to the first lane in a case where the speed of the second preceding vehicle predicted to perform the lane change from the second lane to the first lane is lower than the set speed of the host vehicle even in a case where the speed of the first preceding vehicle in the first lane is higher than the set speed of the host vehicle.

(5) In the aspect of the above (1), after the host vehicle performs the lane change from the first lane to the second lane, the driving controller executes the return lane change from the second lane to the first lane in a case where there is a preceding vehicle in front of the host vehicle in the first lane and a speed of the preceding vehicle is higher than the set speed of the host vehicle.

(6) According to an aspect of this invention, there is provided a vehicle control method including causing a computer to: recognize a peripheral situation of a host vehicle; execute driving control to control one or both of steering and speed of the host vehicle on the basis of a recognized result; perform a lane change from a first lane in which the host vehicle travels to a second lane in a case where a first condition is satisfied, and perform a lane change of returning from the second lane to the first lane in a case where a second condition is satisfied after the lane change to the second lane, the second condition including that a set vehicle speed of the host vehicle is able to be maintained after the host vehicle performs the lane change to the first lane; and determine, in a case where there are one or more preceding vehicles traveling in front of the host vehicle in the first lane, whether the set vehicle speed of the host vehicle is able to be maintained after the host vehicle performs the lane change from the second lane to the first lane on the basis of a speed of the slowest of the one or more preceding vehicles and a speed of the host vehicle, and determine whether a return lane change from the second lane to the first lane is performed on the basis of a determination result.

(7) According to an aspect of this invention, there is provided a computer readable non-transitory storage medium having a program stored therein, the program causing a computer to: recognize a peripheral situation of a host vehicle; execute driving control to control one or both of steering and speed of the host vehicle on the basis of a recognized result; perform a lane change from a first lane in which the host vehicle travels to a second lane in a case where a first condition is satisfied, and perform a lane change of returning from the second lane to the first lane in a case where a second condition is satisfied after the lane change to the second lane, the second condition including that a set vehicle speed of the host vehicle is able to be maintained after the host vehicle performs the lane change to the first lane; and determine, in a case where there are one or more preceding vehicles traveling in front of the host vehicle in the first lane, whether the set vehicle speed of the host vehicle is able to be maintained after the host vehicle performs the lane change from the second lane to the first lane on the basis of a speed of the slowest of the one or more preceding vehicles and a speed of the host vehicle, and determine whether a return lane change from the second lane to the first lane is performed on the basis of a determination result.

According to the aspects of the above (1) to (7), it is possible to execute more appropriate passing control.

DESCRIPTION OF EMBODIMENTS

Hereinafter, an embodiment of a vehicle control device, a vehicle control method, and a storage medium of the present invention will be described with reference to the accompanying drawings.

[Overall Configuration]

Figure 1:
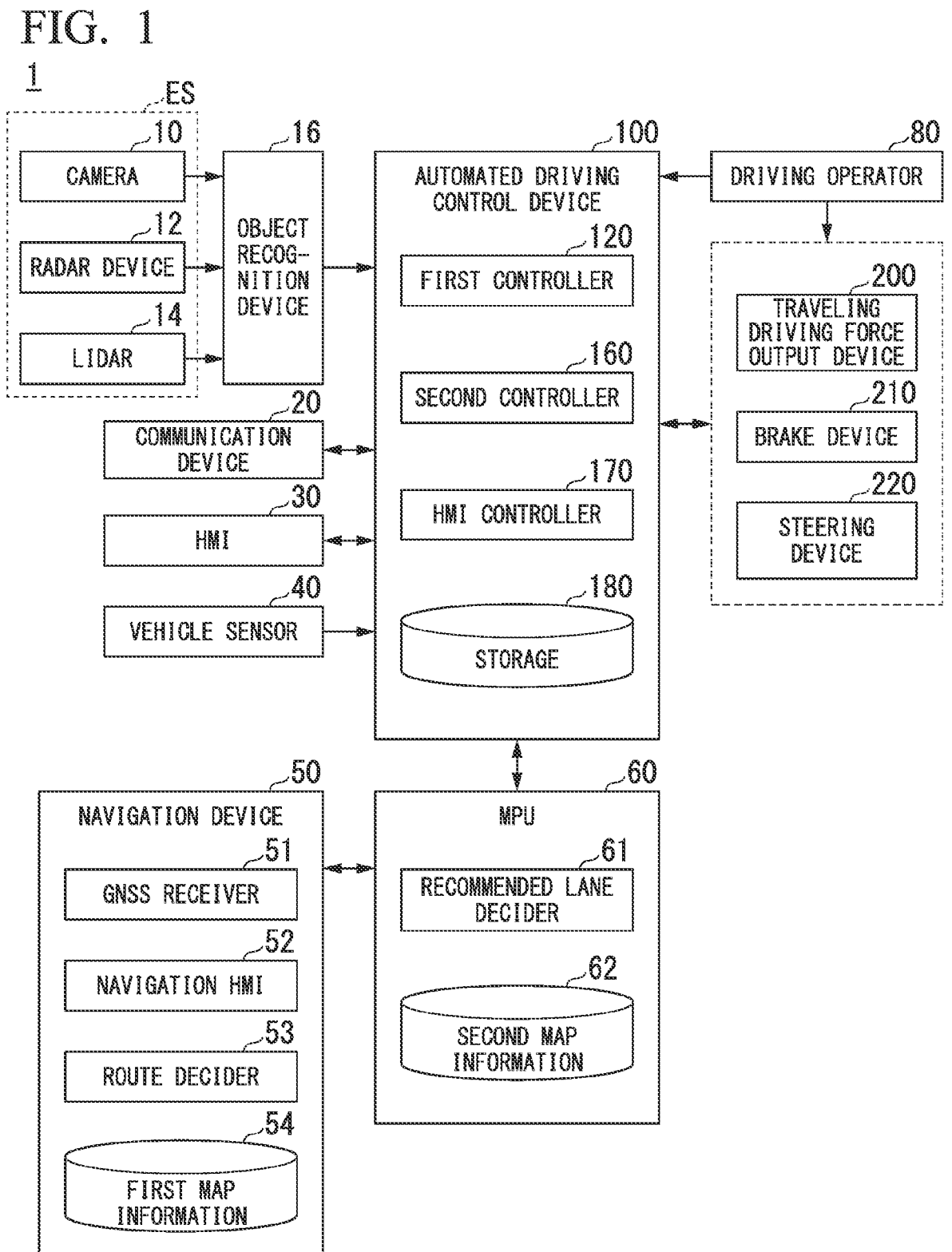
FIG. 1 is a configuration diagram of a vehicle system using a vehicle control device according to an embodiment.

FIG. 1 is a configuration diagram of a vehicle system 1 using a vehicle control device according to an embodiment. A vehicle having the vehicle system 1 mounted therein (hereinafter referred to as a host vehicle M) is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell. As an example, an embodiment in which the vehicle control device is applied to an automated driving vehicle will be described below. Automated driving involves, for example, automatically controlling one or both of steering or acceleration/deceleration of the host vehicle M to execute driving control. Driving control of the host vehicle M may include, for example, various types of driving assistance such as adaptive cruise control (ACC), auto lane changing (ALC), or a lane keeping assistance system (LKAS). The automated driving vehicle may be partially or wholly controlled by manual driving by an occupant (a driver).

The vehicle system 1 includes, for example, a camera (an example of an image capturer) 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added. A combination of the camera 10, the radar device 12, and the LIDAR 14 is an example of an "external sensor ES." The external sensor ES may include other detectors that recognize the peripheral situation of a vehicle, and may include the object recognition device 16. The HMI 30 is an example of an "output device." The automated driving control device 100 is an example of a "vehicle control device."

The camera 10 is a digital camera using a solid-state imaging element such as, for example, a charge coupled device (CCD) or a complementary metal oxide semiconductor (CMOS). The camera 10 is installed at any point on the host vehicle M. For example, in a case where a forward image of the host vehicle M is captured, the camera 10 is installed on the upper portion of the front windshield, the rear surface of the rear-view mirror, or the like. In a case where a rearward image of the host vehicle M is captured, the camera 10 is installed on the upper portion of the rear windshield, the back door, or the like. In a case where a sideward and back-sideward image of the host vehicle M is captured, the camera 10 is installed on the side mirror or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point on the host vehicle M. The radar device 12 may detect the position and speed of an object with a frequency modulated continuous wave (FM-CW) system.

The LIDAR 14 irradiates the vicinity of the host vehicle M with light (or electromagnetic waves having a wavelength close to that of light), and measures scattered light. The LIDAR 14 detects a distance to an object on the basis of a time from light emission to light reception. The irradiation light is, for example, pulsed laser light. The LIDAR 14 is installed at any point on the host vehicle M.

The object recognition device 16 recognizes the position, type, speed, or the like of an object by performing a sensor fusion process on the results of detection performed by some or all of the camera 10, the radar device 12, and the LIDAR 14 included in the external sensor ES. The object recognition device 16 outputs the recognition results to the automated driving control device 100. The object recognition device 16 may output the detection results of the camera 10, the radar device 12, and the LIDAR 14, as they are, to the automated driving control device 100. The object recognition device 16 may be omitted from the vehicle system 1.

The communication device 20 communicates another vehicle which is present in the vicinity of the host vehicle M using, for example, a cellular network, a Wi-Fi network, Bluetooth (registered trademark), dedicated short range communication (DSRC), or the like, or communicates with various types of server devices through a wireless base station.

The HMI 30 presents various types of information to an occupant of the host vehicle M under the control of an HMI controller 170, and accepts an input operation performed by the occupant. The HMI 30 includes, for example, various types of display devices, a speaker, a switch, a microphone, a buzzer, a touch panel, a key, and the like. Various types of display devices are, for example, a liquid crystal display (LCD), an organic electro luminescence (EL) display device, and the like. The display device is provided, for example, in the vicinity of the front of a driver's seat (a seat closest to the steering wheel) in an instrument panel, and is installed at a position that can be visually recognized by an occupant from a gap in the steering wheel or over the steering wheel. The display device may be installed in the center of the instrument panel. The display device may be a head up display (HUD). The HUD projects an image onto a portion of the front windshield in front of the driver's seat to thereby allow the eyes of the occupant who sits on the driver's seat to visually recognize a virtual image. The display device displays an image which is generated by the HMI controller 170 to be described later. The HMI 30 may include a driving changeover switch or the like that switches between automated driving and manual driving by an occupant. The switch includes, for example, a blinker switch (direction indicator). The blinker switch is provided, for example, on a steering column or a steering wheel. The blinker switch is an example of an operator that accepts, for example, an occupant's instruction to change the lane of the host vehicle M. The switch may include a switch for adjusting the set speed of the host vehicle M. The set speed is, for example, a speed which is set in accordance with the travel environment or driving conditions of the host vehicle M. The set speed is, for example, a speed which is set on the basis of the speed limit (legal speed) of a road on which a vehicle is traveling. The set speed is a speed that can be changed within a predetermined allowable range based on the speed limit through the driver's switch operation. For example, in a case where the automated driving control device 100 causes the host vehicle M to follow a preceding vehicle traveling in front of the host vehicle M through ACC, the following may be executed within the range of the set speed, and in a case where the set speed cannot be maintained, passing control for passing the preceding vehicle, or the like may be started.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like. The vehicle sensor 40 may include a steering angle sensor that detects the steering angle of the host vehicle M (which may be the angle of the steering wheel or may be the operation angle of the steering wheel). The vehicle sensor 40 may include a position sensor that acquires the position of the host vehicle M. The position sensor is, for example, a sensor that acquires position information (longitude and latitude information) from a Global Positioning System (GPS) device. The position sensor may be a sensor that acquires position information using a global navigation satellite system (GNSS) receiver 51 of the navigation device 50.

The navigation device 50 includes, for example, the global navigation satellite system (GNSS) receiver 51, a navigation HMI 52, and a route decider 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route decider 53 decides, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like.

The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server using the communication device 20, and acquire the same route as the route on a map from the navigation server.

The MPU 60 includes, for example, a recommended lane decider 61, and holds second map information 62 in a storage device such as an HDD or a flash memory. The recommended lane decider 61 divides the route on a map provided from the navigation device 50 into a plurality of blocks (for example, divides the route on a map every 100 [m] in a vehicle traveling direction), and decides a recommended lane for each block with reference to the second map information 62. The recommended lane decider 61 makes a decision on which lane from the left to travel in. In a case where a branch point is present in the route on a map, the recommended lane decider 61 decides a recommended lane so that the host vehicle M can travel along a logical route for advancing to a branch destination.

The second map information 62 is map information having a higher accuracy than the first map information 54. The second map information 62 includes, for example, information of the center of a lane, information of the boundary of a lane, or the like. The second map information 62 may include road information, traffic regulation information, address information (an address or a postal code), facility information, telephone number information, or the like. The second map information 62 may be updated when necessary by the communication device 20 communicating with another device.

The driving operator 80 includes, for example, an accelerator pedal, a brake pedal, a shift lever, and other operators in addition to the steering wheel. A sensor that detects the amount of operation or the presence or absence of operation is installed on the driving operator 80, and the detection results are output to the automated driving control device 100, or some or all of the traveling driving force output device 200, the brake device 210, and the steering device 220. The steering wheel is an example of "an operator that accepts a steering operation by a driver." The operator does not necessarily have to be annular, and may be in the form of variant steering, a joystick, a button, or the like. A steering grasp sensor 84 is installed on a steering wheel 82. The steering grasp sensor 84 is realized by a capacitance sensor or the like, and outputs a signal that makes it possible to detect whether a driver is grasping the steering wheel 82 (which means that the driver is in contact with the steering wheel while applying force) to the automated driving control device 100.

The automated driving control device 100 includes, for example, a first controller 120, a second controller 160, the HMI controller 170, and a storage 180. The first controller 120, the second controller 160, and the HMI controller 170 are realized by a hardware processor such as, for example, a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device. A combination of a behavior plan generator 140 and the second controller 160 are an example of a "driving controller." The HMI controller 170 is an example of an "output controller."

The storage 180 may be realized by various storage devices described above, a solid state drive (SSD), an electrically erasable programmable read only memory (EE-PROM), a read only memory (ROM), a random access memory (RAM), or the like. The storage 180 stores, for example, an adjustment table 182, programs, various types of other information, and the like. The adjustment table 182 is a table which is referred to in order to adjust the range in which another vehicle is present in a case where it is determined whether the lane of the host vehicle M is changed. The details of the adjustment table 182 will be described later. The storage 180 may store, for example, the first map information 54 and the second map information 62.

Figure 2:
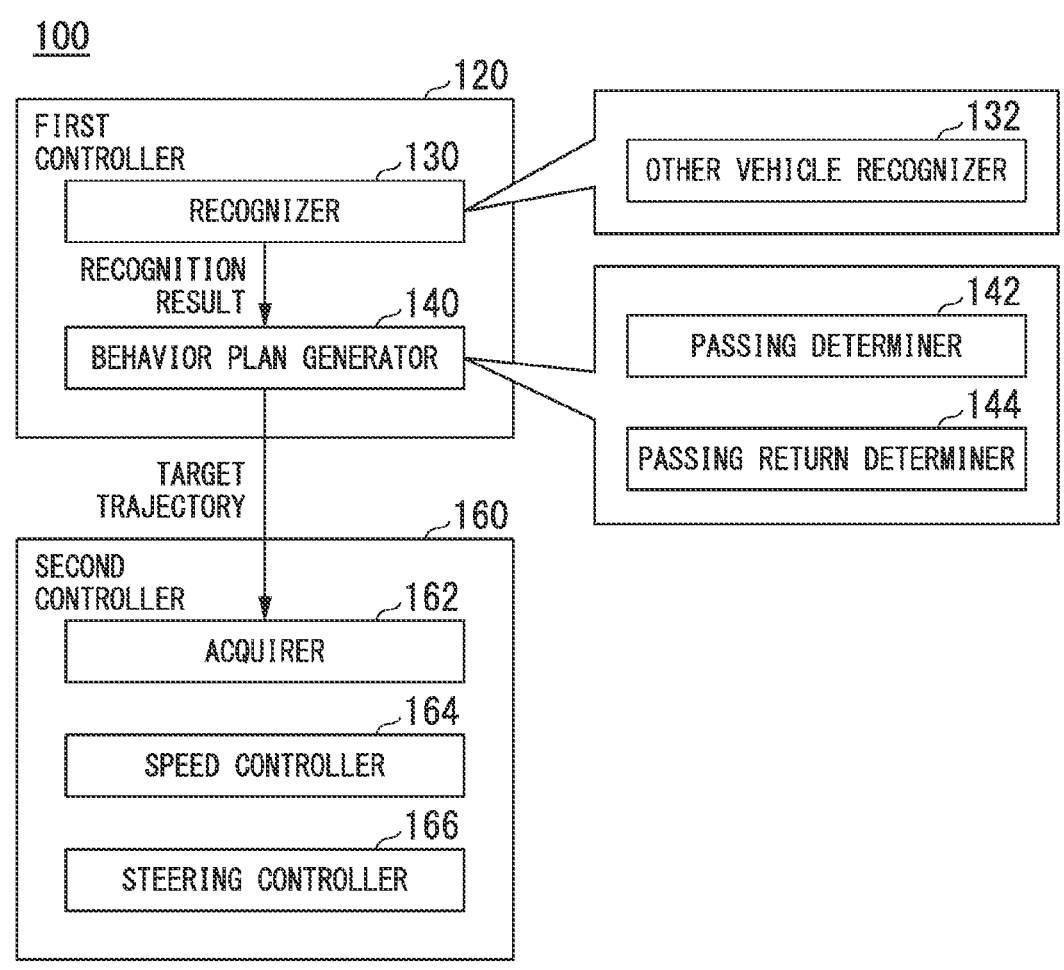
FIG. 2 is a functional configuration diagram of a first controller and a second controller according to the embodiment.

FIG. 2 is a functional configuration diagram of the first controller 120 and the second controller 160 according to the embodiment. The first controller 120 includes, for example, a recognizer 130 and the behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal for which pattern matching is possible or a road sign) imparted in advance being concurrently executed, and performing comprehensive evaluation by performing scoring on both. Thereby, the reliability of automated driving is secured.

The recognizer 130 recognizes the state of the position, speed, acceleration, or the like of an object located in the vicinity of the host vehicle M on the basis of information input from the external sensor ES. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a region. The "state" of the object may include the acceleration or jerk of the object, or a "behavior state" (for example, whether it is performing or attempting to perform a lane change).

The recognizer 130 recognizes, for example, a lane (traveling lane) in which the host vehicle M is traveling. For example, the recognizer 130 recognizes the right and left partition lines of the host vehicle M from a camera image captured by the camera 10, and recognizes the traveling lane on the basis of the position of the recognized partition lines. The recognizer 130 may recognize the traveling lane by recognizing targets (a driving boundary, a road boundary) that make it possible to specify the lane position including a shoulder, a curbstone, a median strip, guardrail, a fence, a wall, and the like without being limited to the recognition of the partition line. In this recognition, the position of the host vehicle M acquired from the navigation device 50 or processing results based on an INS may be added. The recognizer 130 may recognize an adjacent lane which is adjacent to the traveling lane, a stop line, an obstacle, a red signal, a tollbooth, and other road events.

Upon recognizing a traveling lane, the recognizer 130 recognizes the position or posture of the host vehicle M with respect to the traveling lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a partition line or a road boundary) of the traveling lane, as the relative position of the host vehicle M with respect to the traveling lane. The recognizer 130 includes, for example, an other vehicle recognizer 132. The details of this function will be described later.

The behavior plan generator 140 generates a target trajectory along which the host vehicle M will travel in the future automatically (irrespective of a driver's operation) so that the host vehicle M travels in the recommended lane determined by the recommended lane decider 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the host vehicle M will arrive at sampling times for respective predetermined sampling times. In this case, information of a target speed or target acceleration is represented by an interval between trajectory points. In a case where the set speed of the host vehicle M is determined in advance, the behavior plan generator 140 may generate a target trajectory such that the speed of the host vehicle M becomes the set speed within a range in which the vehicle can travel. For example, in a case where the host vehicle cannot travel at a speed within an allowable range based on the set speed due to the influence of a preceding vehicle traveling in front of the host vehicle M during the execution of ACC (or in a case where it is predicted that the host vehicle cannot travel), the behavior plan generator 140 may generate a target trajectory for releasing ACC or passing a preceding vehicle traveling at a low speed.

The behavior plan generator 140 may set automated driving events (function) in generating a target trajectory. Examples of the automated driving events include a constant-speed traveling event, a following traveling event, a lane change event, a divergence event, a merging event, a passing event, a passing return event, an overtaking event, and the like. The behavior plan generator 140 generates a target trajectory according to a started event. The behavior plan generator 140 includes, for example, a passing determiner 142 and a passing return determiner 144. The details of these functions will be described later.

The second controller 160 controls the traveling driving force output device 200, the brake device 210, and the steering device 220 so that the host vehicle M passes along the target trajectory generated by the behavior plan generator 140 according to scheduled times.

The second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The HMI controller 170 notifies an occupant of predetermined information through the HMI 30. The predetermined information includes, for example, information related to traveling of the host vehicle M such as information on the state of the host vehicle M or information on driving control. The information on the state of the host vehicle M includes, for example, the speed of the host vehicle M, the engine speed, the shift position, and the like. The information on driving control includes, for example, an inquiry as to whether to perform a lane change, whether to execute passing control or passing return control, whether to execute a driving mode, information on changing the driving mode, information imposed on an occupant which is required to switch the driving mode (information on a task request for the occupant), information on the status of driving control (for example, content of the event being executed), and the like. The predetermined information may include information which is not relevant to traveling control of the host vehicle M such as a television program or content (for example, a move) stored in a storage medium such as a DVD. The predetermined information may include, for example, the current position and destination of the host vehicle M, information on the remaining amount of fuel, information indicating whether the traveling lane of the host vehicle M has been specified, the remaining distance until the driving mode is switched, the direction of lane increase or decrease, the number of lanes to be increased or decreased, the number of lanes parallel to the traveling lane (the number of parallel lanes), and the like.

For example, the HMI controller 170 may generate an image including the above-described predetermined information to display the generated image on a display device of the HMI 30, or may generate a sound indicating predetermined information to output the generated sound from a speaker of the HMI 30. The HMI controller 170 may output information accepted by the HMI 30 to the communication device 20, the navigation device 50, the first controller 120, and the like.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which input from the second controller 160 or the information which input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Other Vehicle Recognizer, Passing Determiner, Passing Return Determiner]

Hereinafter, the details of functions of the other vehicle recognizer 132, the passing determiner 142, and the passing return determiner 144 will be described in detail. Hereinafter, description will focus mainly on the behavior of performing a lane change from a first lane (home lane) in which the host vehicle M travels to a second lane (passing lane) to pass another vehicle (preceding vehicle) in the home lane on the basis of the presence or absence of the other vehicle near the host vehicle M or the position and speed of the other vehicle and then performing a lane change from the second lane back to the first lane (also referred to as return lane change control or return control). The following description is passing control in several situations.

<First Situation>

Figure 3:
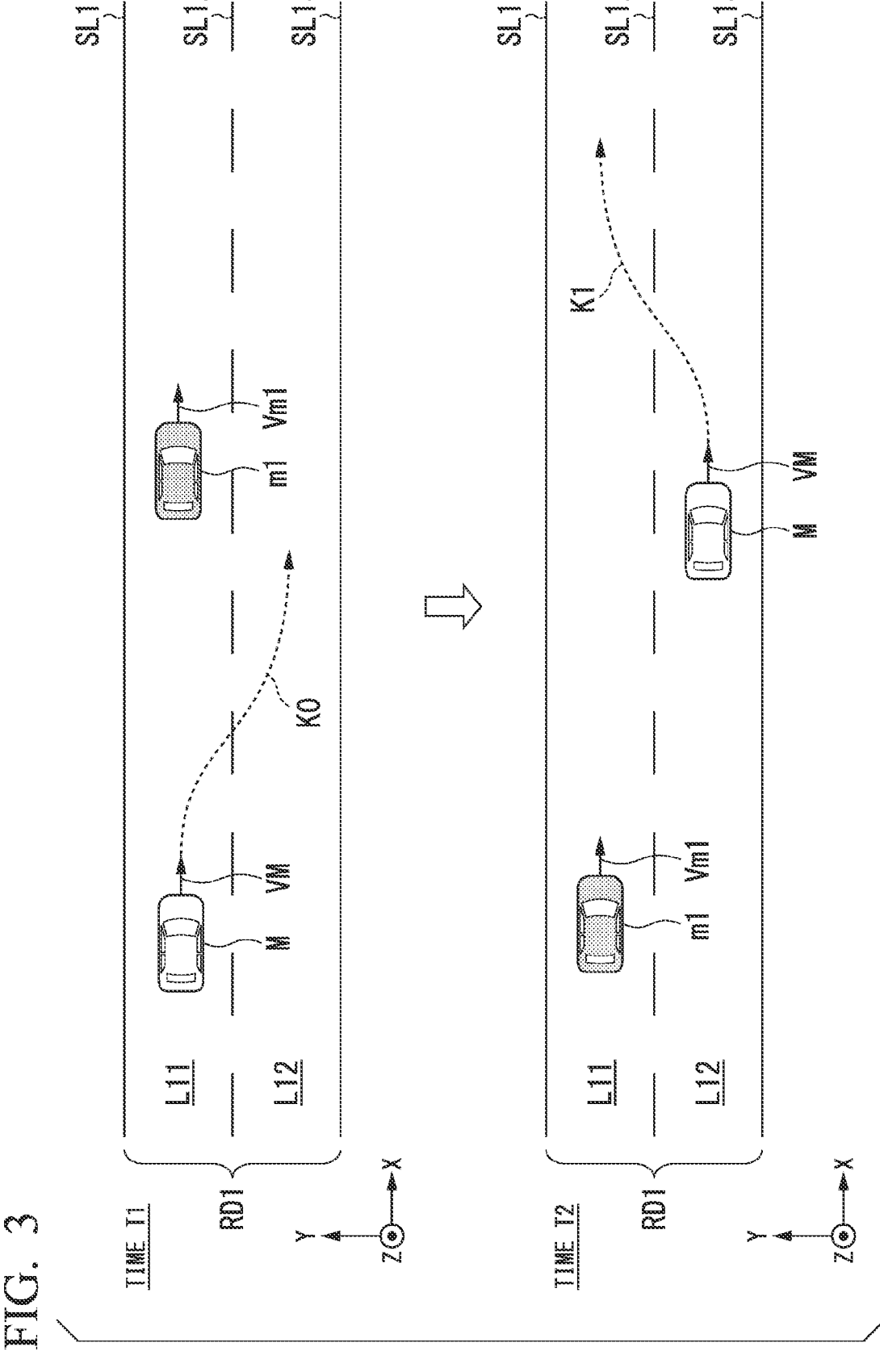
FIG. 3 is a diagram illustrating passing control in a first situation.

FIG. 3 is a diagram illustrating passing control in a first situation. The example of FIG. 3 shows a road RD1 including lanes L11 and L12 in which travel in the same direction (X-axis direction in the drawing) is possible. The lane L11 is partitioned by road partition lines SL11 and SL12, and the lane L12 is partitioned by road partition lines SL12 and SL13. Time T1 in FIG. 3 shows the state of the host vehicle M before the passing control is executed, and time T2 shows the state thereof after the passing control is executed and before passing return control is executed. In the example of FIG. 3, it is assumed that the host vehicle M is traveling at a speed VM and another vehicle m1 is traveling at a speed Vm1. In the example of FIG. 3, the speed VM is assumed to be faster than the speed Vm1.

In the example of FIG. 3, it is assumed that the host vehicle M is traveling at a speed within an allowable range based on the set speed and the speed VM can be paraphrased as the set speed VM. The same applies to the description of the second and subsequent situations to be described later.

The other vehicle recognizer 132 recognizes another vehicle which is present in the vicinity of the host vehicle M (within a predetermined distance centered on the host vehicle M) from feature information such as the shape and size of an object on the basis of information input from the external sensor ES. The other vehicle recognizer 132 recognizes the relative position and relative speed between the host vehicle M and the other vehicle. The other vehicle recognizer 132 may recognize whether the other vehicle is approaching the host vehicle M or moving away from the host vehicle M on the basis of the amount of change in the relative position and relative speed. In a case where the other vehicle is not recognized by the other vehicle recognizer 132, the behavior plan generator 140 generates a target trajectory along which the host vehicle M continuously travels in its traveling lane at the set speed, and driving control is executed so that the host vehicle M travels along the generated target trajectory. The behavior plan generator 140 may, for example, generate a target trajectory to follow a preceding vehicle through ACC.

At time T1 shown in FIG. 3, it is assumed that the other vehicle (hereinafter referred to as the "preceding vehicle" as necessary) m1 traveling in front of the host vehicle M is recognized by the other vehicle recognizer 132. In this case, the passing determiner 142 determines whether a first condition is satisfied and control for the host vehicle M to pass the preceding vehicle (passing control) is executed on the basis of the relative speed ΔV (speed VM–speed Vm1) and relative distance between the host vehicle M and the preceding vehicle m1, the surrounding road situation, and the like. The passing control is, for example, control in which the host vehicle M changes its lane from the lane L11 (an example of the first lane) to the adjacent lane L12 (an example of the second lane) to pass the preceding vehicle m1. The first condition is, for example, that the distance between the host vehicle M and the preceding vehicle m1 is less than a predetermined distance and the relative speed is equal to or higher than a predetermined speed. The first condition may be that a time to collision (TTC) between the host vehicle M and the preceding vehicle m1 is less than a threshold. The time to collision TTC is, for example, a value which is calculated by dividing the relative distance by the relative speed. The threshold may be, for example, a fixed value, or may be a variable value which is set according to the speed VM of the host vehicle M, the speed of the other vehicle, the road situation, and the like. The first condition may include the presence of sufficient space for a lane change in the second lane (the lane L12). The passing determiner 142 determines that the passing control is executed in a case where the first condition is satisfied, and determines that the passing control is not executed in a case where the first condition is not satisfied.

In a case where it is determined by the passing determiner 142 that the passing control is to be executed, the behavior plan generator 140 generates a target trajectory K0 for performing a lane change from the lane L11 to the lane L12, and causes the second controller 160 to execute driving control so that the host vehicle M travels along the generated target trajectory K0.

Time T2 shown in FIG. 3 indicates a state in which the host vehicle M has performed a lane change from the lane L11 to the lane L12 and has passed the preceding vehicle m1 through the passing control. In this case, the passing return determiner 144 determines whether the second condition is satisfied and passing return control is executed. The passing return control is, for example, control including a lane change for returning the traveling lane of the host vehicle M to the original lane (the traveling lane before passing) L11 after the passing control is executed.

In the first situation, the second condition is that there is no preceding vehicle in the lane L11 to which the host vehicle M is to perform a lane change. Further, the second condition may include that the speed of another vehicle (rearward vehicle) behind the host vehicle M traveling in the lane L11 is lower than the speed of the host vehicle M. In the situation at time T2 in FIG. 3, there is no other vehicle in front of the host vehicle M, and the speed Vm1 of the other vehicle m1 which is a lane change destination of the host vehicle M is lower than the speed VM of the host vehicle M. That is, at time T2, there is no other vehicle approaching the host vehicle M. Therefore, the passing return determiner 144 determines that the passing return control can be executed because the second condition is satisfied. In a case where it is determined that the passing return control can be executed, the behavior plan generator 140 generates a target trajectory K1 for causing the host vehicle M to perform a lane change from the lane L12 to the lane L11, and causes the second controller to execute driving control so that the host vehicle M travels along the generated target trajectory K1.

As described above, in the first situation, in a case where a lane change from the lane L11 to the lane L12 is performed to pass the preceding vehicle m11, and then there is no preceding vehicle in the lane L12, the passing return lane change is executed.

<Second Situation>

Figure 4:
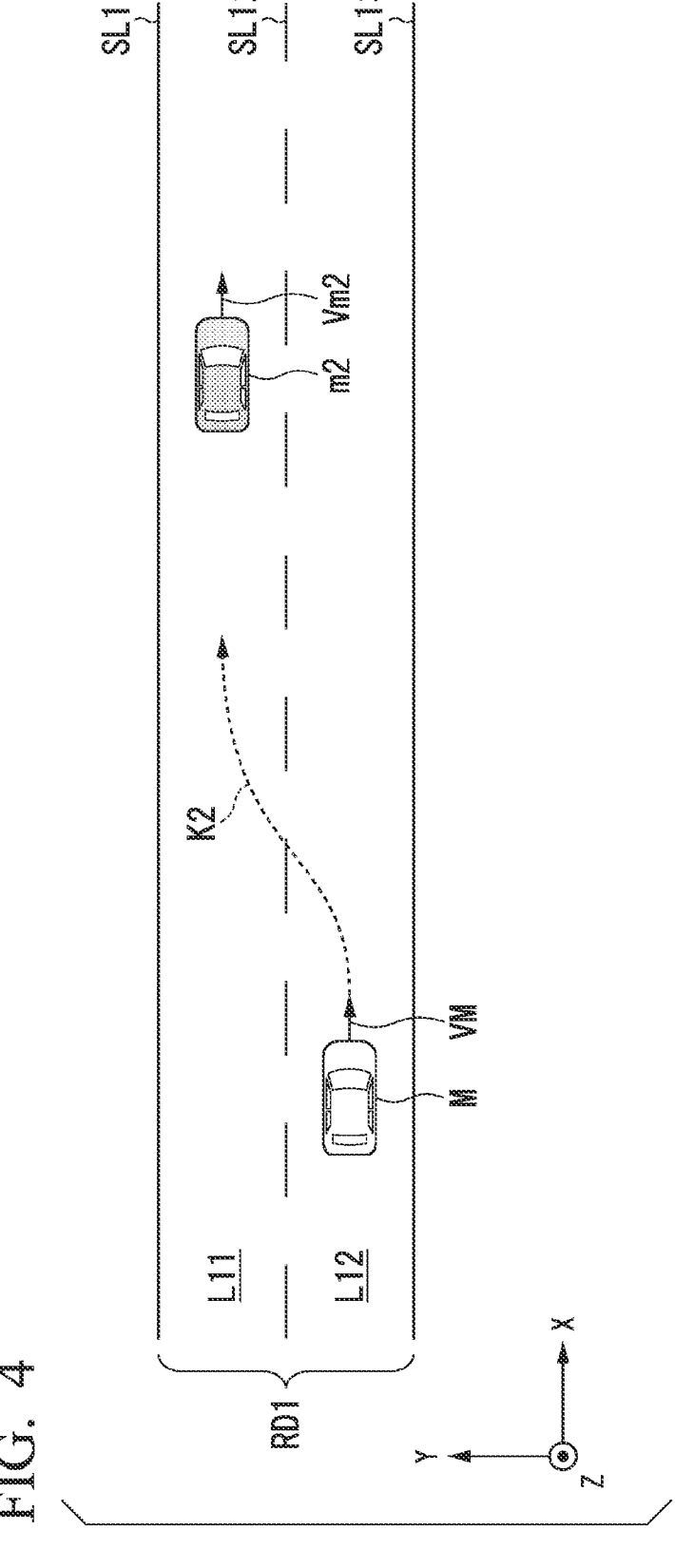
FIG. 4 is a diagram illustrating passing control in a second situation.

FIG. 4 is a diagram illustrating passing control in a second situation. In the second situation, description will focus mainly on the passing return control after a lane change from the lane L11 to the lane L12 is performed to pass the other vehicle m1 (that is, at a point in time of time T2). The same applies to the description of the third and subsequent situations to be described later.

In the example of FIG. 4, the host vehicle M is traveling in the lane L12 of the road RD1 at a speed VM, and another vehicle m2 is traveling in front of the host vehicle M in the lane L11 which is a return lane change destination of the host vehicle M at a speed Vm2. In the second situation, the speed Vm2 of the other vehicle m2 is assumed to be higher than the speed (for example, the set speed) VM of the host vehicle M.

The passing return determiner 144 determines whether the passing return control is executed. The second condition in the second situation is a case where there is a preceding vehicle of the host vehicle M in the lane L11 which is a lane change destination and a case where the speed of the preceding vehicle is higher than the speed VM of the host vehicle M. In this case, even when the host vehicle M executes a return lane change of returning from the lane L12 to the lane L11, a case does not occur in which the speed VM of the host vehicle M becomes lower than the set speed due to the influence of the preceding vehicle. Therefore, in the second situation, the passing return determiner 144 determines that the second condition is satisfied and the passing return control can be executed. In a case where it is determined that the passing return control can be executed, the behavior plan generator 140 generates a target trajectory K2 for causing the host vehicle M to perform a lane change from the lane L12 to the lane L11, and causes the second controller 160 to execute driving control so that the host vehicle M travels along the generated target trajectory K2. The behavior plan generator 140 may generate a target trajectory for causing the host vehicle M to follow the preceding vehicle m2 after the lane change to the lane L11 is completed.

As described above, in the second situation, even in a case where there is a preceding vehicle in the lane L11, the speed of the preceding vehicle and the set speed of the host vehicle M are compared with each other and the passing return control is executed in a case where the speed of the preceding vehicle is higher.

<Third Situation>

Figure 5:
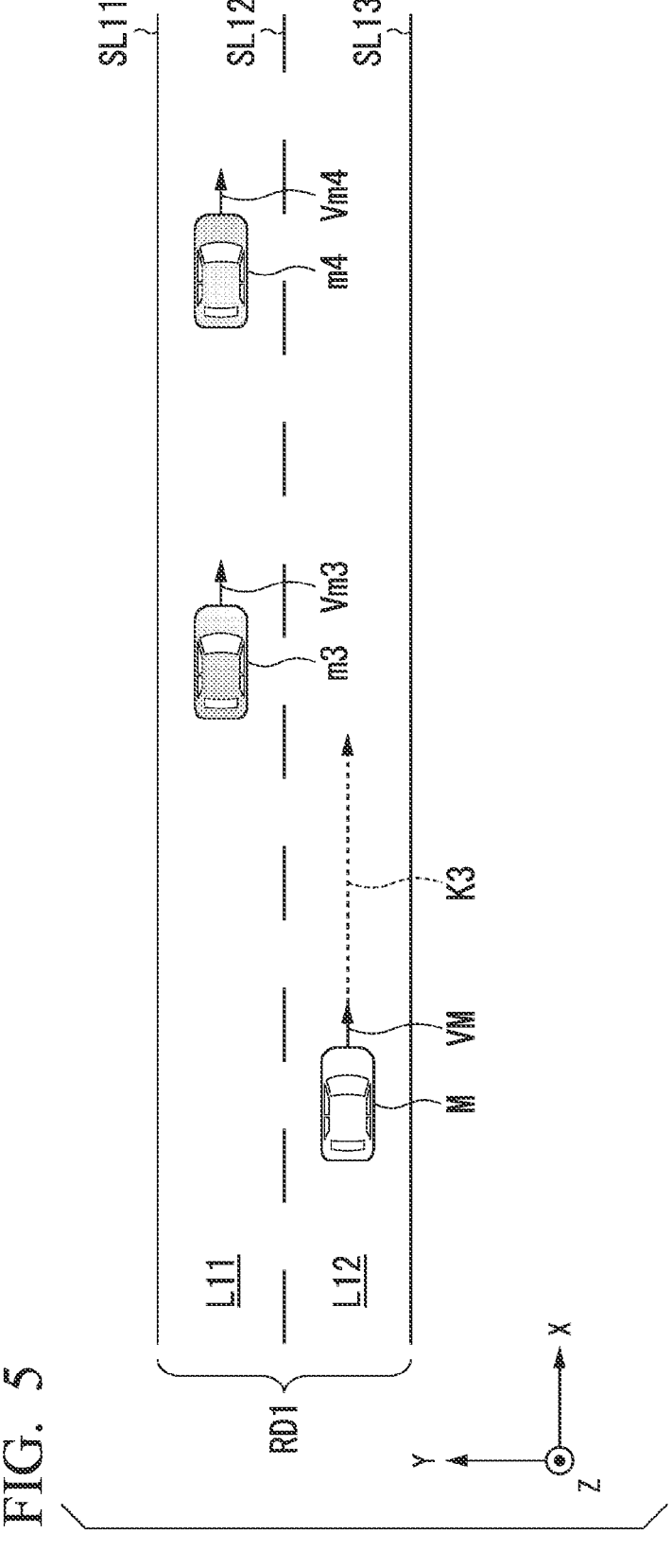
FIG. 5 is a diagram illustrating passing control in a third situation.

FIG. 5 is a diagram illustrating passing control in a third situation. In the example of FIG. 5, the host vehicle M is traveling in the lane L12 of the road RD1 at a speed VM, another vehicle m3 is traveling in front of the host vehicle M at a speed Vm3 in the lane L11 which is a return lane change destination, and another vehicle m4 is traveling in front of the other vehicle m3 at a speed Vm4 in the lane L11. In the third situation, it is assumed that the speed (set speed) M of the host vehicle M is lower than the speed Vm3 of the other vehicle m3 and higher than the speed Vm4 of the other vehicle m4 (that is, there is a relation of "speed Vm4<speed VM<speed Vm3").

The passing return determiner 144 determines whether the second condition is satisfied and the passing return control is executed on the basis of the positions and speeds of the other vehicles m3 and m4 traveling in the lane L11 which is a lane change destination of the host vehicle M. The second condition in the third situation is a case where there are one or more other vehicles in front of the host vehicle M in the lane L11 to which the host vehicle M performs the passing return control, and the speed of the slowest other vehicle among the other vehicles is higher than the set speed of the host vehicle M.

In the example of FIG. 5, the speed Vm4 of the other vehicle m4 is lower than the speed Vm3 of the other vehicle m3, and the speed Vm4 is lower than the speed VM of the host vehicle. Therefore, in a case where the host vehicle M is caused to perform a lane change from the lane L12 to the lane L11 through the passing return control, there is a possibility of the host vehicle M not being able to travel at the set vehicle speed. Therefore, in the third situation, since the second condition is not satisfied, the passing return determiner 144 determines that the passing return control is not executed. In this case, the behavior plan generator 140 generates a target trajectory K3 for causing the host vehicle M to continue to travel in the current traveling lane L12 thereof, and causes the host vehicle M to travel along the generated target trajectory.

As described above, in the third situation, in a case where there are a plurality of preceding vehicles in the lane L11 and a case where there is a vehicle slower than the host vehicle M among the preceding vehicles, the passing return control (return lane change) is inhibited from being executed.

<Fourth Situation>

Figure 6:
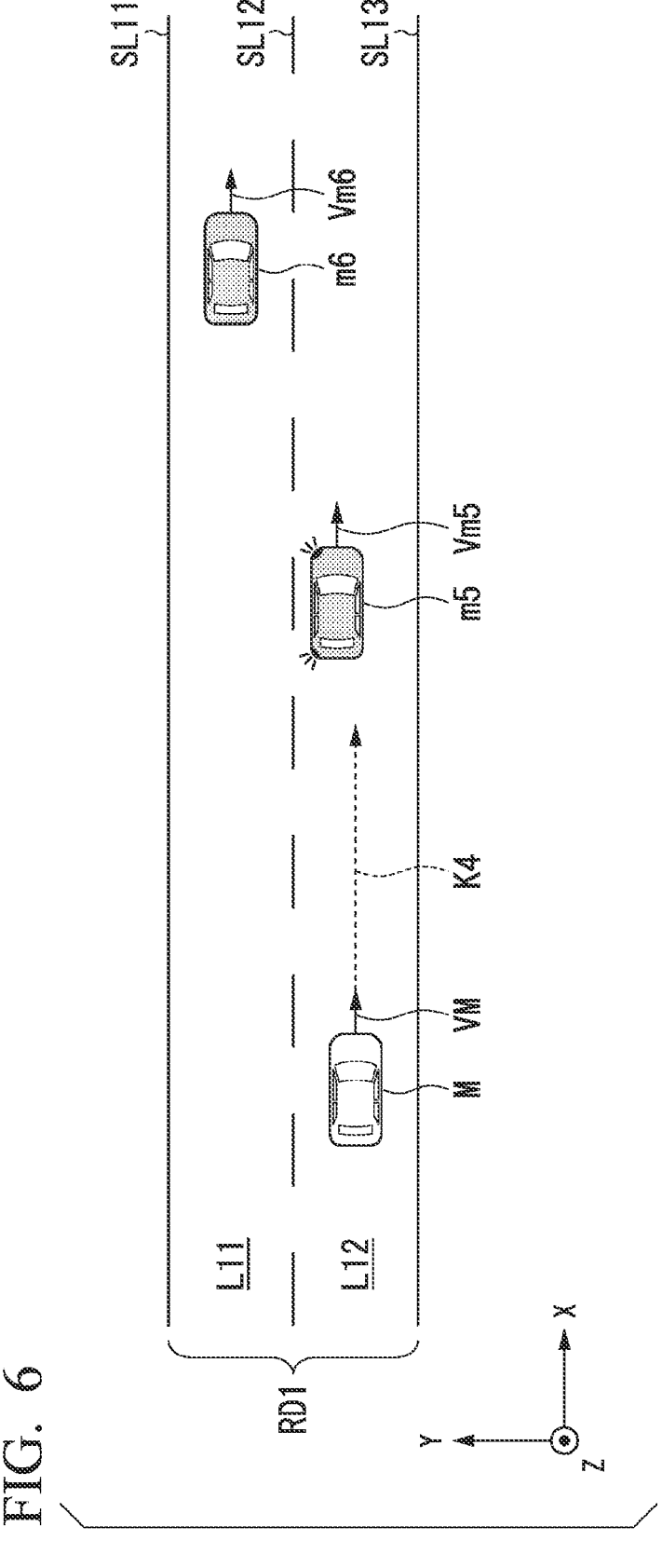
FIG. 6 is a diagram illustrating passing control in a fourth situation.

FIG. 6 is a diagram illustrating passing control in a fourth situation. In the example of FIG. 6, the host vehicle M is traveling in the lane L12 of the road RD1 at a speed VM, another vehicle m5 is traveling in front of the host vehicle M in the lane L12 at a speed Vm5, and another vehicle m6 is traveling ahead of the other vehicle m5 and in the lane L11 in which the host vehicle M makes a lane change return at a speed Vm6. In the fourth situation, the speed (set speed) VM of the host vehicle M is assumed to be lower than the speed Vm5 of the other vehicle m5 and higher than the speed Vm6 of the other vehicle m6 (speed Vm6<speed VM<speed Vm5). The other vehicle m6 is an example of "a first preceding vehicle traveling in front of the host vehicle M in the first lane," and the other vehicle m5 is an example of "a second preceding vehicle traveling in front of the host vehicle M in the second lane."

In the fourth situation, the passing return determiner 144 first determines whether the other vehicle m5 traveling in the same lane as the host vehicle M performs a lane change to a lane (return lane) which is a lane change destination of the host vehicle M (or is predicted to perform a lane change). For example, it is determined whether the blinker (direction indicator) of the other vehicle m5 is lit on the basis of image capture of the camera 10, and in a case where the blinker is lit, the passing return determiner 144 determines that the other vehicle m5 is predicted to perform a lane change in a direction in which the blinker is lit. The passing return determiner 144 may determine that the other vehicle m5 is predicted to perform a lane change in a case where the other vehicle m5 is closer to the lane L11 side which is a lane change destination than the center of the lane L12 or a case where a portion of the other vehicle m5 is present on the lane L11 side beyond the road partition line SL12.

In the fourth situation, in a case where the other vehicle m5 traveling at a higher speed than the host vehicle M is predicted to perform a lane change to a lane (return lane) which is a lane change destination of the host vehicle M, the passing return determiner 144 determines whether passing return control (return lane change) is executed using the same second condition as in the third situation described above, assuming that the other vehicles m5 and m6 are traveling in the lane L11.

In the fourth situation, the speed of the other vehicle m6 traveling ahead of the other vehicle m5 in the lane L12 is lower than the speeds of the other vehicle m5 and the host vehicle M. Therefore, after the other vehicle m5 performs a lane change, it is assumed to slow down to the same speed as the other vehicle m6. Further, the speed Vm6 of the other vehicle m6 is lower than the speed (set speed) VM of the host vehicle M. Therefore, in the fourth situation, the passing return determiner 144 determines that the second condition is also not satisfied and that a lane change to the return lane is not executed.

Therefore, the behavior plan generator 140 generates a target trajectory K4 for causing the host vehicle M to continue to travel in the current traveling lane L12 thereof on the basis of the determination result, and causes the host vehicle M to travel along the generated target trajectory.

As described above, in the fourth situation, when a second preceding vehicle in the lane L12 performs a lane change to the lane L11 (performs a cutout), the passing return control is inhibited from being executed in a case where there is a first preceding vehicle in the lane L11 which is slower than the set speed of the host vehicle M.

<Fifth Situation>

Next, a fifth situation will be described with reference to FIG. 6. The fifth situation differs from the fourth situation in that the speed of the host vehicle M (more specifically, the speed of the set vehicle speed) VM is lower than the speed Vm6 of the other vehicle m6 and higher than the speed Vm5 of the other vehicle m5 (speed Vm5<speed VM<speed Vm6).

In the fifth situation, similarly to the fourth situation, the passing return determiner 144 determines whether the other vehicle m5 traveling in the same lane as the host vehicle M performs a lane change to the lane (return lane) L11 which is a lane change destination of the host vehicle M (or is predicted to perform a lane change). In the fifth situation, it is assumed that the other vehicle m5 is determined by the passing return determiner 144 to be predicted to perform a lane change to the lane (return lane) which is a lane change destination of the host vehicle M.

Here, in the fifth situation, there is a possibility of the other vehicle m5 accelerating in order to follow the other vehicle m6 after a lane change. On the other hand, there may also be a possibility of traveling at the speed Vm5 at it is without following the other vehicle m6. In this case, assuming that the other vehicle m5 travel without accelerating even after lane change (at the speed Vm5), the passing return determiner 144 determines that the second condition is not satisfied and that the passing return control is not executed.

Therefore, similarly to the fourth situation, the behavior plan generator 140 generates a target trajectory K4 for causing the host vehicle M to continue to travel in the current traveling lane L12, and causes the host vehicle M to travel along the generated target trajectory.

As described above, in the fifth situation, when a second preceding vehicle in the lane L12 performs a lane change to the first lane (performs a cutout), and even when there is a first preceding vehicle in the first lane which is faster than the set speed of the host vehicle M, the passing return lane change is inhibited from being executed in a case where the cut-out preceding vehicle is slower than the set speed.

As in the fourth and fifth situations described above, even in a case where there are a plurality of preceding vehicles in front of the lane L11 which is a return lane change destination of the host vehicle M, it is possible to determine whether the passing return control is executed more appropriately on the basis of each speed and position (which vehicle is in front). Even in situations other than the first to fifth situations described above, the passing return control may be inhibited from being executed in a situation where the speed of the host vehicle M after the passing return control does not become a speed within an allowable range based on the set speed.

[Process Flow]

Figure 7:
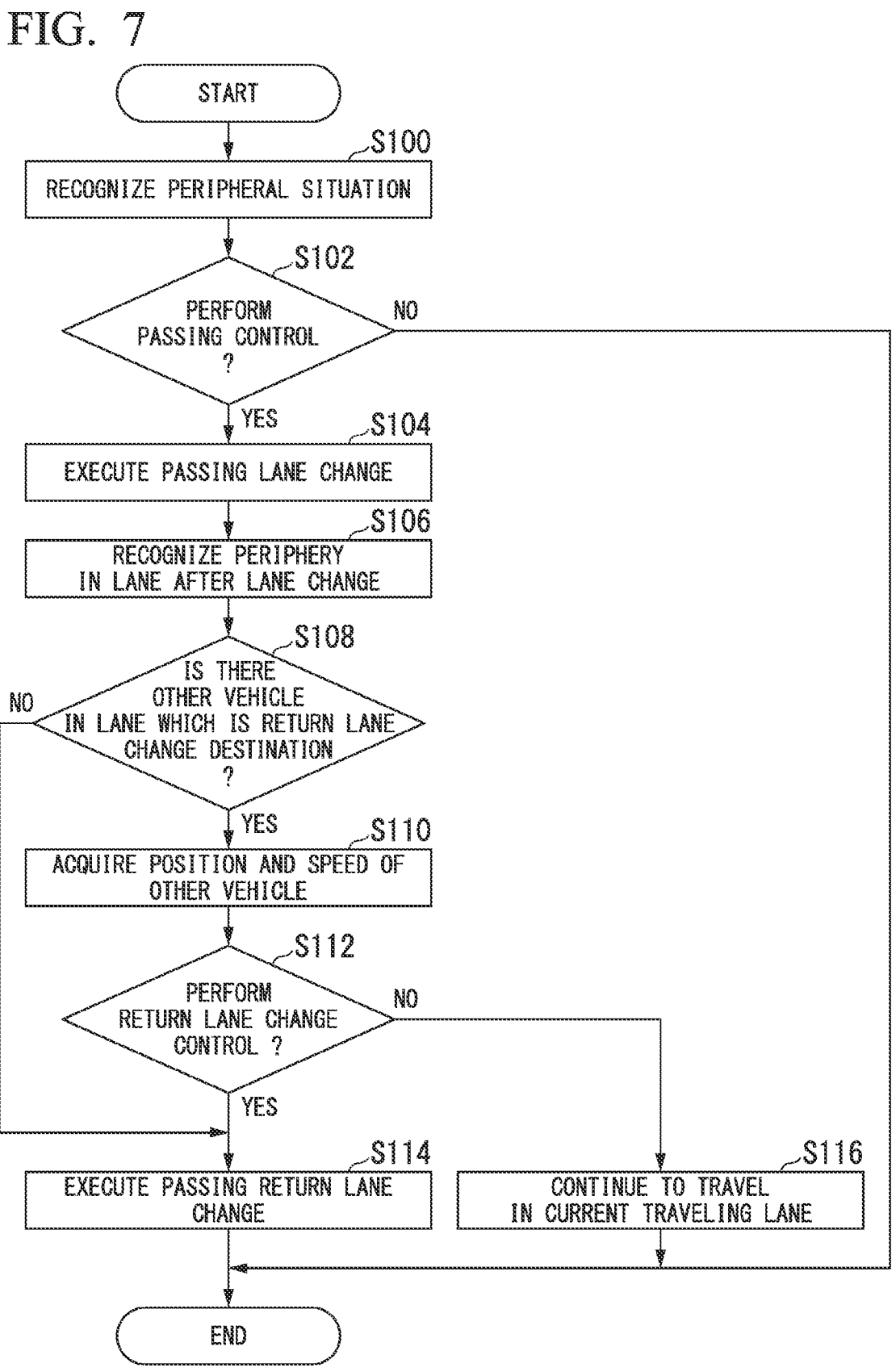
FIG. 7 is a flowchart illustrating an example of a flow of processes which are executed by an automated driving control device according to the embodiment.

FIG. 7 is a flowchart illustrating an example of a flow of processes which are executed by the automated driving control device 100 of the embodiment. In the processes shown in FIG. 6, description will focus mainly on a passing return control process among various processes which are executed by the automated driving control device 100. The processes shown in FIG. 7 may be repeatedly executed in a predetermined period or at a predetermined timing.

In the example of FIG. 7, the recognizer 130 recognizes the peripheral situation of the host vehicle M (step S100). The process of step S100 includes a process in which the other vehicle recognizer 132 recognizes another vehicle. Next, the passing determiner 142 determines whether passing control to pass a preceding vehicle is performed (step S102). In a case where it is determined that the passing control is executed, passing lane change is executed in the driving control (step S104). In the process of step S104, for example, the behavior plan generator 140 generates a target trajectory for performing a lane change to an adjacent lane (passing lane) without contacting the other vehicle on the basis of the relative speed, relative distance, or the like between the host vehicle M and the other vehicle present in its vicinity, and the second controller 160 executes driving control so that the host vehicle M travels along the target trajectory.

Next, the recognizer 130 recognizes the peripheral situation in the lane (passing lane) after the lane change (step S106). Next, the passing return determiner 144 determines whether there is another vehicle (for example, a preceding vehicle) in a lane which is a return lane change destination (step S108). In a case where it is determined that there is another vehicle, the passing return determiner 144 acquires the position and speed of the other vehicle (step S110), and determines whether the return lane change control is performed on the basis of information on the acquired position and speed (step S112).

In a case where it is determined that the return lane change control is performed or a case where it is determined in the process of step S108 that there is no other vehicle in a lane which is a return lane change destination, the driving controller executes the passing return lane change (step S114). In the process of step S114, for example, the behavior plan generator 140 generates a target trajectory for performing a lane change to an adjacent lane (passing return lane) without contacting the other vehicle on the basis of the relative speed, relative distance, or the like between the host vehicle M and the other vehicle present in its vicinity, and the second controller 160 executes driving control so that the host vehicle M travels along the target trajectory.

In a case where it is determined in the process of step S112 that the return lane change control is not performed or a case where it is determined in the process of step S102 that the passing control is not performed, the driving controller executes driving control to continue to travel in the current traveling lane (step S116). In the process of step S116, for example, the behavior plan generator 140 generates a behavior plan for continuing to travel in the current traveling lane without contacting the other vehicle on the basis of the relative speed between, relative distance, or the like between the host vehicle M and the other vehicle present in its vicinity, and the second controller 160 executes driving control so that the host vehicle M travels along the target trajectory. This concludes the processing of the present flowchart.

According to the above-described embodiment, there is provided a vehicle control device including: a recognizer (130) that recognizes a peripheral situation of a host vehicle; and a driving controller that controls one or both of steering and speed of the host vehicle on the basis of a result of recognition performed by the recognizer (130), wherein the driving controller performs a lane change from a first lane in which the host vehicle travels to a second lane in a case where a first condition is satisfied, and performs a lane change of returning from the second lane to the first lane in a case where a second condition is satisfied after the lane change to the second lane, the second condition including that a set vehicle speed of the host vehicle is able to be maintained after the host vehicle performs the lane change to the first lane, and in a case where there are one or more preceding vehicles traveling in front of the host vehicle in the first lane, the driving controller determines whether the set vehicle speed of the host vehicle is able to be maintained after the host vehicle performs the lane change from the second lane to the first lane on the basis of a speed of the slowest of the one or more preceding vehicles and a speed of the host vehicle, and determines whether a return lane change from the second lane to the first lane is performed on the basis of a determination result, whereby it is possible to execute more appropriate passing control in consideration of the traveling condition after passing control.

Specifically, according to the embodiment, for example, by inhibiting the passing return control on the basis of whether to satisfy the second condition for performing the passing return control (return lane change control) to return from a passing lane to a home lane on the basis of the traveling speed of a preceding vehicle or a following vehicle that performs a lane change from the home lane to the passing lane and then travels in the home lane or the passing lane, for example, immediately after return to the original lane from a passing lane change, it is possible to prevent traveling at the set speed from being maintained in the home lane and to inhibit the next passing lane change from being executed immediately. According to the embodiment, it is possible to inhibit a decrease in speed in a case where a lane change to the home lane is performed.

The above-described embodiment can be represented as follows.

A vehicle control device including:

a storage medium having computer-readable instructions stored therein; and a processor connected to the storage medium, wherein the processor executes the computer-readable instructions to recognize a peripheral situation of a host vehicle, execute driving control to control one or both of steering and speed of the host vehicle on the basis of a recognized result, perform a lane change from a first lane in which the host vehicle travels to a second lane in a case where a first condition is satisfied, and perform a lane change of returning from the second lane to the first lane in a case where a second condition is satisfied after the lane change to the second lane, the second condition including that a set vehicle speed of the host vehicle is able to be maintained after the host vehicle performs the lane change to the first lane, and determine, in a case where there are one or more preceding vehicles traveling in front of the host vehicle in the first lane, whether the set vehicle speed of the host vehicle is able to be maintained after the host vehicle performs the lane change from the second lane to the first lane on the basis of a speed of the slowest of the one or more preceding vehicles and a speed of the host vehicle, and determine whether a return lane change from the second lane to the first lane is performed on the basis of a determination result.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:

a processor that executes instructions to:

recognize a peripheral situation of a host vehicle; and control one or both of steering and speed of the host vehicle on the basis of a result of recognition performed, wherein the processor performs a lane change from a first lane in which the host vehicle travels to a second lane in a case where a first condition is satisfied, and performs a lane change of returning from the second lane to the first lane in a case where a second condition is satisfied after the lane change to the second lane, the second condition including that a set speed of the host vehicle is able to be maintained after the host vehicle performs the lane change to the first lane, and in a case where there are a plurality of preceding vehicles traveling in front of the host vehicle in the first lane, the processor determines whether the set speed of the host vehicle is able to be maintained after the host vehicle performs the lane change from the second lane to the first lane on the basis of a speed of the slowest of the plurality of preceding vehicles and a speed of the host vehicle, and determines whether a return lane change from the second lane to the first lane is performed on the basis of a determination result, wherein, in a case where there are a first preceding vehicle traveling in front of the host vehicle in the first lane and a second preceding vehicle traveling in front of the host vehicle in the second lane and the second preceding vehicle is predicted to perform a lane change from the second lane to the first lane, the processor considers that the second preceding vehicle traveling in the second lane is traveling in the first lane, and determines whether the set speed of the host vehicle is able to be maintained after the host vehicle performs the lane change from the second lane to the first lane on the basis of a speed of the first preceding vehicle, a speed of the second preceding vehicle, and the speed of the host vehicle, wherein, when the first preceding vehicle is traveling at a speed equal to or greater than the set speed and the second preceding vehicle is traveling at a speed lower than the set speed, the processor determines that the set speed of the host vehicle cannot be maintained after the host vehicle changes lanes from the second lane to the first lane, when the first preceding vehicle is traveling at a speed equal to or greater than the set speed and the second preceding vehicle is traveling at a speed equal to or greater than the set speed, the processor determines that the set speed of the host vehicle can be maintained after the host vehicle changes lanes from the second lane to the first lane, wherein the set speed is a speed that can be changed within a predetermined tolerance range based on the speed limit of the lane in which the host vehicle is traveling by operating a switch by an occupant of the host vehicle, and the first condition includes a case where the host vehicle goes from a state in which the host vehicle is following the first preceding vehicle at a speed within a predetermined range of the set speed to a state in which the host vehicle is unable to maintain a speed within the predetermined range of the set speed.

2. The vehicle control device according to claim 1, wherein the processor inhibits the host vehicle from performing the lane change from the second lane to the first lane in a case where the speed of the first preceding vehicle in the first lane is lower than the set speed of the host vehicle, even if there is a possibility that the second preceding vehicle will accelerate after changing lanes to follow the first preceding vehicle.

3. The vehicle control device according to claim 1, wherein the processor inhibits the host vehicle from performing the lane change from the second lane to the first lane in a case where the speed of the second preceding vehicle predicted to perform the lane change from the second lane to the first lane is lower than the set speed of the host vehicle even in a case where the speed of the first preceding vehicle in the first lane is higher than the set speed of the host vehicle.

4. The vehicle control device according to claim 1, wherein, after the host vehicle performs the lane change from the first lane to the second lane, the processor executes the return lane change from the second lane to the first lane in a case where there is a preceding vehicle in front of the host vehicle in the first lane and a speed of the preceding vehicle is higher than the set speed of the host vehicle.

5. A vehicle control method comprising causing a computer to:

recognize a peripheral situation of a host vehicle;

execute driving control to control one or both of steering and speed of the host vehicle on the basis of a recognized result;

perform a lane change from a first lane in which the host vehicle travels to a second lane in a case where a first condition is satisfied, and perform a lane change of returning from the second lane to the first lane in a case where a second condition is satisfied after the lane change to the second lane, the second condition including that a set speed of the host vehicle is able to be maintained after the host vehicle performs the lane change to the first lane;

determine, in a case where there are a plurality of preceding vehicles traveling in front of the host vehicle in the first lane, whether the set speed of the host vehicle is able to be maintained after the host vehicle performs the lane change from the second lane to the first lane on the basis of a speed of the slowest of the plurality of preceding vehicles and a speed of the host vehicle, and determine whether a return lane change from the second lane to the first lane is performed on the basis of a determination result;

in a case where there are a first preceding vehicle traveling in front of the host vehicle in the first lane and a second preceding vehicle traveling in front of the host vehicle in the second lane and the second preceding vehicle is predicted to perform a lane change from the second lane to the first lane, consider that the second preceding vehicle traveling in the second lane is traveling in the first lane; and determine whether the set speed of the host vehicle is able to be maintained after the host vehicle performs the lane change from the second lane to the first lane on the basis of a speed of the first preceding vehicle, a speed of the second preceding vehicle, and the speed of the host vehicle;

determine that the set speed of the host vehicle cannot be maintained after the host vehicle changes lanes from the second lane to the first lane, when the first preceding vehicle is traveling at a speed equal to or greater than the set speed and the second preceding vehicle is traveling at a speed lower than the set speed;

determine that the set speed of the host vehicle can be maintained after the host vehicle changes lanes from the second lane to the first lane, when the first preceding vehicle is traveling at a speed equal to or greater than the set speed and the second preceding vehicle is traveling at a speed equal to or greater than the set speed;

the set speed is a speed that can be changed within a predetermined tolerance range based on the speed limit of the lane in which the host vehicle is traveling by operating a switch by an occupant of the host vehicle; and the first condition includes a case where the host vehicle goes from a state in which the host vehicle is following the first preceding vehicle at a speed within a predetermined range of the set speed to a state in which the host vehicle is unable to maintain a speed within the predetermined range of the set speed.

6. A computer readable non-transitory storage medium having a program stored therein, the program causing a computer to:

recognize a peripheral situation of a host vehicle;

execute driving control to control one or both of steering and speed of the host vehicle on the basis of a recognized result;

perform a lane change from a first lane in which the host vehicle travels to a second lane in a case where a first condition is satisfied, and perform a lane change of returning from the second lane to the first lane in a case where a second condition is satisfied after the lane change to the second lane, the second condition including that a set speed of the host vehicle is able to be maintained after the host vehicle performs the lane change to the first lane;

determine, in a case where there are a plurality of preceding vehicles traveling in front of the host vehicle in the first lane, whether the set speed of the host vehicle is able to be maintained after the host vehicle performs the lane change from the second lane to the first lane on the basis of a speed of the slowest of the plurality of preceding vehicles and a speed of the host vehicle, and determine whether a return lane change from the second lane to the first lane is performed on the basis of a determination result;

in a case where there are a first preceding vehicle traveling in front of the host vehicle in the first lane and a second preceding vehicle traveling in front of the host vehicle in the second lane and the second preceding vehicle is predicted to perform a lane change from the second lane to the first lane, consider that the second preceding vehicle traveling in the second lane is traveling in the first lane; and determine whether the set speed of the host vehicle is able to be maintained after the host vehicle performs the lane change from the second lane to the first lane on the basis of a speed of the first preceding vehicle, a speed of the second preceding vehicle, and the speed of the host vehicle;

determine that the set speed of the host vehicle cannot be maintained after the host vehicle changes lanes from the second lane to the first lane, when the first preceding vehicle is traveling at a speed equal to or greater than the set speed and the second preceding vehicle is traveling at a speed lower than the set speed;

determine that the set speed of the host vehicle can be maintained after the host vehicle changes lanes from the second lane to the first lane, when the first preceding vehicle is traveling at a speed equal to or greater than the set speed and the second preceding vehicle is traveling at a speed equal to or greater than the set speed;

the set speed is a speed that can be changed within a predetermined tolerance range based on the speed limit of the lane in which the host vehicle is traveling by operating a switch by an occupant of the host vehicle; and the first condition includes a case where the host vehicle goes from a state in which the host vehicle is following the first preceding vehicle at a speed within a predetermined range of the set speed to a state in which the host vehicle is unable to maintain a speed within the predetermined range of the set speed.

* * * * *